(12) United States Patent
Winkelmann et al.

(10) Patent No.: US 6,684,996 B2
(45) Date of Patent: Feb. 3, 2004

(54) RELEASE BEARING WITH IMPROVED CONNECTION TO A SEPARATING CLUTCH

(75) Inventors: Ludwig Winkelmann, Erlangen (DE); Steffen Dittmer, Herzogenaurach (DE); Bernhard Klöpfer, Bad Windsheim (DE); Stefan Kurzbeck, Erlangen (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/032,386

(22) Filed: Dec. 21, 2001

(65) Prior Publication Data

US 2002/0117372 A1 Aug. 29, 2002

(30) Foreign Application Priority Data

Dec. 22, 2000 (DE) .......................................... 100 64 833
May 25, 2001 (DE) .......................................... 101 25 691

(51) Int. Cl.[7] ............................................. F16D 23/14
(52) U.S. Cl. ..................................... 192/98; 192/110 B
(58) Field of Search .............................. 192/98, 110 B (56) References Cited

U.S. PATENT DOCUMENTS

| | | | | |
|---|---|---|---|---|
| 3,741,361 A | * | 6/1973 | Brandenstein | 192/110 B |
| 3,913,714 A | * | 10/1975 | Camp | 192/98 |
| 3,998,507 A | * | 12/1976 | Tune | 192/98 |
| 4,448,294 A | * | 5/1984 | Brandenstein et al. | 192/98 |
| 4,585,107 A | * | 4/1986 | Leigh-Monstevens | 192/98 |
| 4,697,681 A | * | 10/1987 | Gay et al. | 192/98 |
| 4,969,755 A | * | 11/1990 | Parzefall | 192/110 B |
| 5,458,541 A | * | 10/1995 | Adler et al. | 474/135 |
| 5,664,890 A | * | 9/1997 | Nowak et al. | 384/282 |
| 6,318,899 B1 | * | 11/2001 | Boyd | 384/492 |

FOREIGN PATENT DOCUMENTS

| | | |
|---|---|---|
| DE | 2 240 383 | 2/1974 |
| DE | 25 24 917 A1 | 1/1976 |
| DE | 31 08 609 A1 * | 10/1982 |
| DE | 37 43 853 A1 | 7/1989 |
| EP | 0 892 188 A1 * | 1/1999 |
| GB | 2 339 000 A | 1/2000 |

OTHER PUBLICATIONS

Figs. 1 and 2 of Japanese document, JP 7-35157 A, Feb.-1995.*

* cited by examiner

Primary Examiner—Rodney H. Bonck
(74) Attorney, Agent, or Firm—Henry M. Feiereisen

(57) ABSTRACT

A release bearing for a separating clutch installed in a motor vehicle, includes a casing movable in an axial direction and operatively connected to an actuating mechanism, a non-rotatable bearing ring having a ring bottom supported by the casing; and a revolving bearing ring having a annular flange. Guided between the bearing rings is a plurality of rolling elements. An engagement disk made of a low-friction and wear-resistant material is securely fixed to the annular flange, and a spring member is operatively connected to the separating clutch and cooperates with the annular flange of the revolving bearing ring, wherein the spring member bears against the engagement disk.

21 Claims, 5 Drawing Sheets

RELEASE BEARING WITH IMPROVED CONNECTION TO A SEPARATING CLUTCH

CROSS-REFERENCES TO RELATED APPLICATIONS

This application claims the priority of German Patent Application, Serial No. 100 64 833.9, filed Dec. 22, 2000, and German Patent Application, Serial No. 101 25 691.4, filed May 25, 2001, the subject matter of which is incorporated herein by reference.

BACKGROUND OF THE INVENTION

The present invention relates to a release bearing which, when installed in a motor vehicle, is intended for actuation of a separating clutch disposed between the internal combustion engine and a gearbox.

Typically, a release bearing includes a first, non-rotatable bearing ring, a second revolving bearing ring, and rolling elements, received in a cage and guided between the first and second bearing rings. The bearing rings are normally made without material removal through a deep-drawing process and formed with an annular bottom, which is oriented, when installed, at a right angle to a symmetry axis of the release bearing. The annular bottom of the non-rotatable bearing ring is supported, when installed, by an axially shiftable casing which is operatively connected with an actuation device. The annular bottom of the revolving bearing ring is operatively connected with a spring member, in particular arms of a disk spring of the separating clutch.

Operation of the separating clutch is typically implemented by depressing a clutch pedal inside the motor vehicle. Upon depression of the pedal, transmission elements or fluids shift the release bearing against the spring member of the separating clutch, in particular the arms of the disk spring. During operation, a relative movement in radial direction is encountered between the disk spring and the annular bottom of the revolving bearing ring in the contact area of the disk spring and the annular bottom of the bearing ring. Superimposed movements as a result of the axial impact of the disk spring arms and axial oscillations triggered by the internal combustion engine via the separating clutch lead to severe wear in the presence of a purely metallic contact of the disk spring upon the annular flange of the bearing ring. This support further results in an annoying noise and increases the required pedal forces for depression of the clutch pedal, thereby adversely affecting the overall driving comfort.

Various attempts have been undertaken to reduce wear in the contact area. German Pat. No. DE 22 40 383 A1 discloses a release bearing with bearing rings that have been made through a material removal process. The revolving inner bearing ring forms a contact surface which points toward the separating clutch. An attachment ring is supported by this contact surface and is placed between the disk spring of the separating clutch and the release bearing for compensating an axial offset between the rotating components of the separating clutch and the rotating components of the actuating device. When installed, the attachment ring allows a relative axial movement in relation to the radial contact surface of the revolving bearing ring. The contact surface between the frictional components, i.e. the attachment ring and the support surface, is lined with a friction-reducing coating. In order to restrict the radial mobility of the attachment ring, when the separating clutch is engaged, the attachment ring has an outer axial collar on the outside spaced in radial direction to the outer contour of the contact surface of the bearing ring. As a consequence, the collar encircles the contact surface. A sheet metal disk is attached on the free collar end, which points toward the release bearing and radially overlaps the outer contour of the contact surface of the revolving bearing ring to thereby captivate the attachment ring.

This conventional release bearing suffers shortcomings because the floating disposition on the rotating bearing ring does not allow a defined position of the installed attachment ring. A defined state is also not possible because a relative movement between the attachment ring and the disk spring as well as between the attachment ring and the rotating bearing ring cannot be excluded. Moreover, the release bearing requires a relatively large space for installation in axial as well as radial directions as a consequence of the fabrication of the components through a material removing process and the floating disposition of the attachment ring upon the rotating bearing ring.

It would therefore be desirable and advantageous to provide an improved release bearing which obviates prior art shortcomings.

SUMMARY OF THE INVENTION

According to one aspect of the present invention, a release bearing for a separating clutch installed in a motor vehicle, includes a casing movable in an axial direction and operatively connected to an actuating mechanism; a non-rotatable bearing ring having a ring bottom supported by the casing; a revolving bearing ring having an annular flange; a plurality of rolling elements guided between the bearing rings; an engagement disk made of a low-friction and wear-resistant material and securely fixed to the annular flange; and a spring member operatively connected to the separating clutch and cooperating with the annular flange of the revolving bearing ring, wherein the spring member bears against the engagement disk.

The present invention resolves prior art problems by providing a wear-reducing, frictionally optimized and compact engagement disk which is yet cost-efficient to manufacture and ensures a long service life demanded by the automobile industry.

Through the provision of the engagement disk which is secured in place and yet centered upon the annular flange of the revolving bearing ring, the relative movement between the spring member, the disk spring of the separating clutch and the revolving bearing ring is established solely between the frictional components, engagement disk and disk spring or its spring arms. At the same time, the rigid disposition of the engagement disk on the rotating bearing ring results in a clear definition of the required installation space. The engagement disk can be made compact in axial as well as radial directions. As the engagement disk can be made of wear-reducing material, required actuation forces or pedal forces are decreased, thereby enhancing the operating and driving comfort and produces a damping effect of the engagement disk. This is especially desired in vehicles of high engine power.

Suitably, the engagement disk is secured to the annular flange of the revolving bearing ring through a form-fitting (positive) connection. According to one embodiment of the present invention, the engagement disk may be formed about its circumference with collar segments which engage behind or embrace the annular flange for attachment of the engagement disk to the bearing ring. The collar segments may be formed with holding elements configured as retaining lugs for engagement in radial cutouts or recesses of the annular flange to thereby realize a snap-connection of the engagement disk upon the annular flange.

According to another embodiment of the present invention, the engagement disk may have axially projecting cams or protrusions for engagement in complementary recesses of the annular flange, wherein the cams allow a limited rotation of the engagement disk with respect to the annular flange and thereby secure the engagement disk against rotation in end position with respect to the revolving bearing ring. This type of safeguard against rotation can also be implemented by a bayonet connection and can be so configured that the cams of the engagement disk as well as the recesses in the annular flange of the revolving bearing ring can be integrated in the fabrication process of the component, without increasing the manufacturing costs. The recesses, which permit a limited rotation of the engagement disk in relation to the annular flange, are so arranged that the cams seek the holding position during operation of the internal combustion engine so as to prevent a spontaneous detachment.

According to another feature of the present invention, the engagement disk may be secured to the revolving bearing ring by a force-fitting (non-positive) connection. One option includes the provision of a high-temperature glue which can be applied partially or completely onto the contact surface between the engagement disk and the annular flange. Of course a combination of form-fitting connection and force-fitting connection between the engagement disk and the annular flange of the revolving bearing ring may also be conceivable.

According to another feature of the present invention, the engagement disk and the revolving bearing ring are made of different materials. Material choice may depend on optimum strength, wear behavior or friction conditions. For example, the revolving bearing ring may be made of steel, e.g., in a cost-efficient manner through a shaping process without material removal, such as through a deep drawing process.

When the engagement disk is made of a material which differs from the material of the bearing ring so that varying coefficients of expansion are involved in such a combination, particular consideration is required in conjunction with the attachment of the engagement disk upon the annular flange. According to another feature of the present invention, the annular flange may hereby be provided about its circumference with radial cutouts for form-fitting engagement of axial cams, protrusions and/or collar segments of the engagement disk. During installation, a plastic deformation occurs, whereby reliefs positioned adjacent both sides of the cutouts are at least partially filled by the material of the cams. In this way, this type of securement allows a radial movement of the axial cams or protrusions of the engagement disk in relation to the annular flange in the area of the radial cutouts. This is true even when the engagement disk is fixed in place to the bearing ring, i.e., a relative displacement between the annular flange and the engagement disk is possible as a consequence of the particular coefficients of expansion in view of the different materials. In this way, tension, which would adversely affect the fatigue strength of the engagement disk, is avoided.

It is also conceivable to fabricate the engagement disk of different materials. Examples of suitable materials include steel, thermoplastic and duroplastic as well as ceramic. In the event the engagement disk is made of steel, at least the area of the contact surface for support of the spring member, connected to the separating clutch and comprised of the disk spring with the elastic spring arms, is lined with a sliding-enhancing coating or a friction-reducing coating. Examples includes a PTFE coating or also molybdenum sulfide ($MOS_2$) or a PVD coating. The use of an engagement disk of steel has the advantage that the bearing ring has a same coefficient of expansion as the engagement surface so that tension between the bearing ring and the engagement disk is avoided. The modulus of elasticity of steel further allows an elastic snap-connection of the engagement disk with the annular flange of the revolving bearing ring through provision of retention elements, thereby simplifying the assembly.

According to another feature of the present invention, the engagement disk may be made of plastic, e.g. a duroplastic compound containing suitable additives. Friction and wear as well as strength can be positively influenced, when using as additive a phenol-formaldehyde (PF) containing glass fibers and/or carbon fibers, as well as graphite and/or molybdenum sulfide and/or polyphenylene sulfone (PPSO2).

The engagement disk may also be made of thermoplastic material, e.g. based on a highly heat-resistant polyamide (PA46) or polyaryletherketone (PAEK). These type of plastics may contain suitable additives such as carbon fibers and/or aramide fibers for enhancing the strength and improving wear resistance. Additives such as molybdenum sulfide or graphite and/or polytetrafluoroethylene as well as polyphenylene sulfone are suitable to reduce friction. An injection molding process is suitably employed, when making the engagement disk of plastic material.

According to another feature of the present invention, the engagement disk may be spray-coated as a coating directly onto the annular flange of the revolving bearing ring. A centered disposition of the engagement disk can be realized by extending the coating to the inner circumference of the annular bottom of the revolving bearing ring. Another option to implement an immobile disposition of the engagement disk upon the annular bottom includes the application of the coating such that the coating at least partially encircles the outer contour of the annular flange.

According to another feature of the present invention, the engagement disk may be made of ceramic. Ceramic has a high strength and thus is effectively wear-resistant. Like duroplastic, ceramic has a lower modulus of elasticity than steel so that the provision of an elastic snap-on connection of the engagement disk via retention elements onto the annular flange of the revolving bearing ring is precluded. This type of an engagement disk can then be secured to the annular flange by a form-fitting connection in the form of a bayonet type coupling. A possibility of such a form-fitting connection involves insertion of cams, formed in one piece with the engagement disk and having retaining lugs, in axial recesses or reliefs of the annular flange. Through subsequent turning of the engagement disk, the retaining lugs are seated firmly in the recesses so as to secure the engagement disk in place with respect to the annular flange and to safeguard the engagement disk against a rotation. As a consequence, the engagement disk is securely mounted to the annular flange and prevented from detachment during running internal combustion engine.

In order to use release bearings for high rpm in conjunction with elevated operating and ambient temperatures, as encountered, for example, in double-disk clutches, some components of the release bearing may be made of ceramic. Suitable components include the annular flange, the rolling elements as well as the revolving bearing ring. Lubrication of a such a release bearing can be realized by a dry lubricant.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals.

Figure 1:
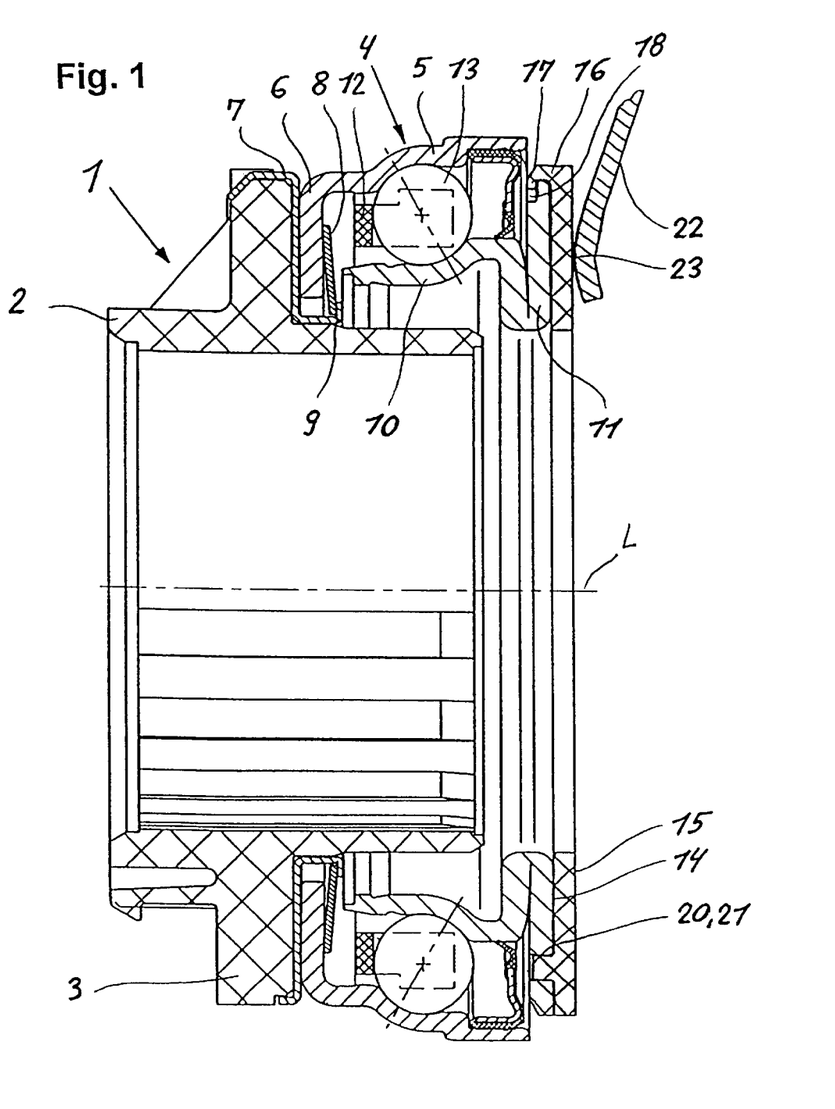
FIG. 1 is a sectional view of an actuating device having incorporated therein a release bearing according to the present invention.

Turning now to the drawing, and in particular to FIG. 1, there is shown a sectional view of a clutch actuating device, generally designated by reference numeral 1 and including a casing 2 defined by a longitudinal axis L and supported for movement in a direction of the longitudinal axis L. The casing 2 is made of plastic and positioned in concentric surrounding relationship to a, not shown, driveshaft which connects an internal combustion engine to a gearbox. The casing 2 is formed with a radial shoulder 3 which is directed outwards for support of a release bearing, generally designated by reference numeral 4. The release bearing 4 is configured in the form of a tapered roller bearing and includes a non-rotatable outer bearing ring 5 which is formed with an annular bottom or skirt 6 turned radially inwards. Interposed between the skirt 6 and the shoulder 3 of the casing 2 is a clip 7 which has one end portion embracing a radial end of the shoulder 3 and another end portion resting against a confronting wall surface of the casing 2. A disk spring 8 is positioned between a shoulder 9 at the other end portion of the clip 9 and the skirt 6 and applies a force to hold the skirt 6 in abutment against the shoulder 3 of the outer bearing ring 5 via the clip 7.

The release bearing 4 further includes an inner revolving bearing ring 10 which is formed in one piece with a radially projecting annular flange 11. Guided between confronting raceways of the outer bearing ring 5 and the inner bearing ring 10, respectively, are a plurality of rolling elements 13 which are held by a cage 12.

Securely fixed in place to the flange 11 of the inner bearing ring 10 is an engagement disk 15 which covers a wide area of the entire confronting support surface 14 of the flange 11. An immobile attachment of the engagement disk 15 to the annular flange 11 is realized by providing the engagement disk 15 about part of its circumference with collar segments 16, each of which terminating in a radially inwardly turned retaining lug 17 for form-fitting engagement in a complementary radial recess 18 of the annular flange 11 at the side facing the rolling elements 13, when installed.

In order to prevent the engagement disk 15 from rotating relative to the annular flange 11, the engagement disk 15 is formed with a protrusion 20 for form-fitting engagement in a complementary opening 21 of the annular flange 11. Bearing against the flange-distal side of the engagement disk 15 is a spring member 22, which is connected to a separating clutch, not shown in FIG. 1, whereby the engagement disk 15 and the spring member 22 define a contact surface 23.

A displacement of the actuation device 1 in the direction of the longitudinal axis L results in a shift of the contact surface 23 between the spring member 22 and the engagement disk 15 in a radial direction. In order to reduce friction and thus wear, the contact surface 23 is suitably lined with a friction-reducing and wear-resistant coating.

Figure 2:
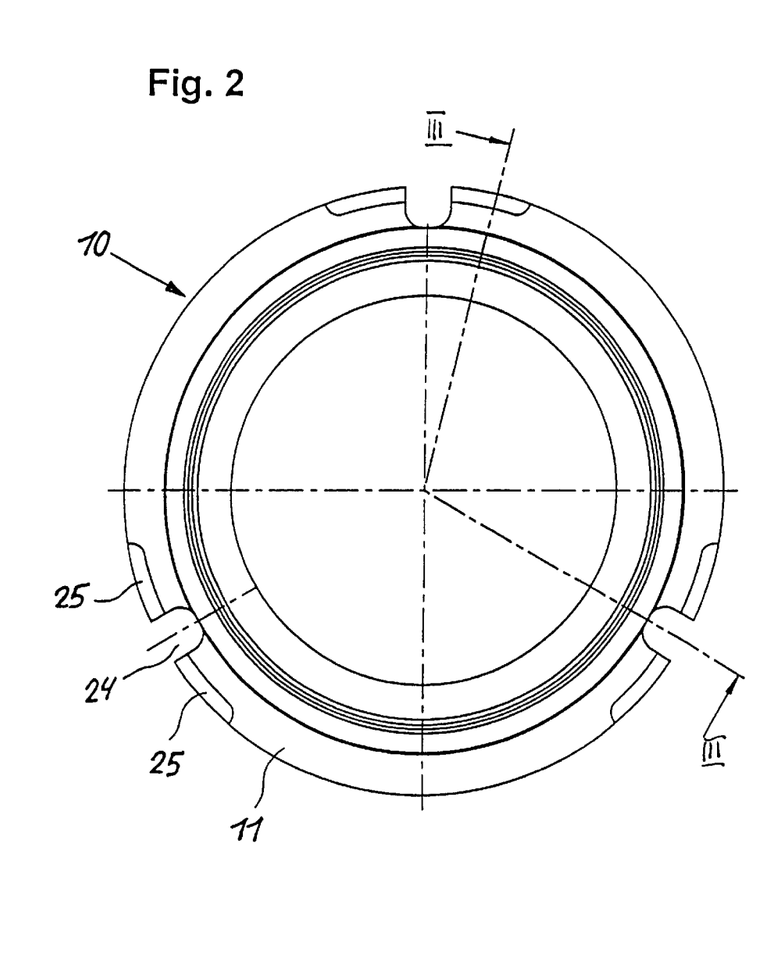
FIG. 2 is a plan view of a first variation of a revolving bearing ring for incorporation in the release bearing and interaction with an engagement disk according to the present invention.
Figure 3:
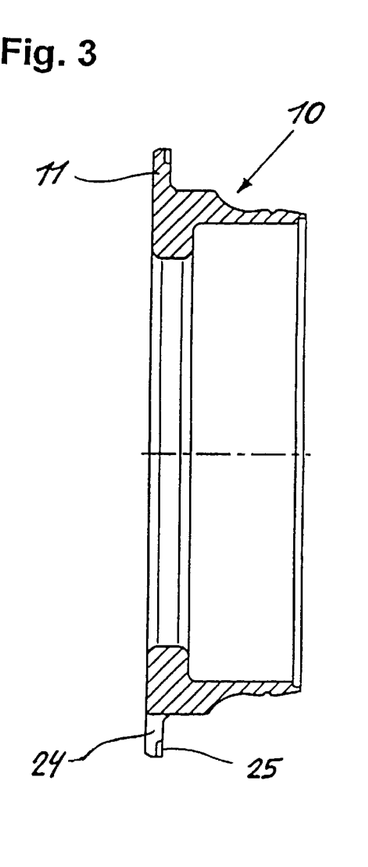
FIG. 3 is a longitudinal section of the bearing ring of FIG. 2, taken along the line III—III in FIG. 2.

Turning now to FIG. 2, there is shown a plan view of a first variation of the revolving bearing ring 10 for interaction with a complementary engagement disk, not shown here. In describing FIG. 2, like parts of the release bearing corresponding with those of the release bearing 4 in FIG. 1 will be identified by corresponding reference numerals and not explained again. In this embodiment, the annular flange 11 of the bearing ring 10 is formed about its circumference with radial cutouts 24 in symmetric spaced-apart relationship for form-fitting engagement of, not shown, axial cams or protrusions of the engagement disk 15. Arranged adjacent each cutout 24 on each side thereof is a groove 25 in which the retaining lug 17 of the collar segment 16 can engage and can be firmly seated. FIG. 3 shows in particular the configuration of the cutout 24 as well as location and depth of the groove 25.

Figure 4:
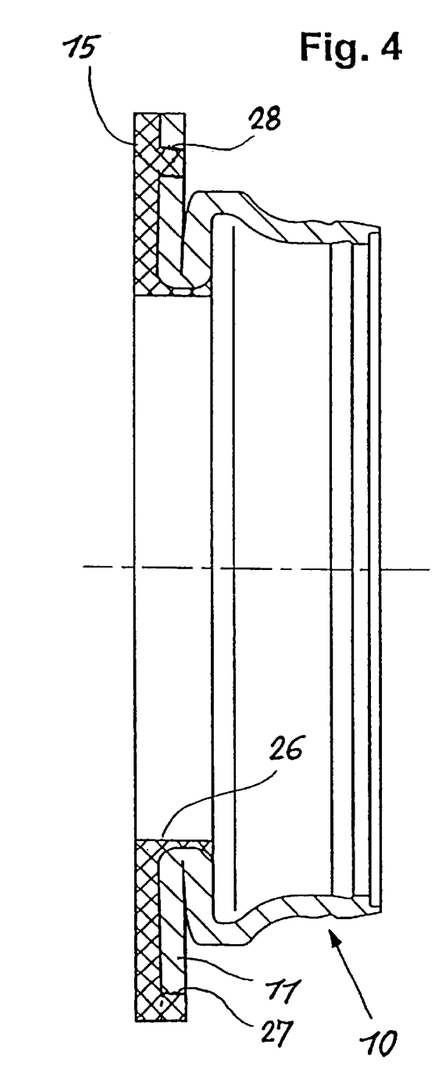
FIG. 4 is a sectional view of a second variation of a combination of a revolving bearing ring with engagement disk of the release bearing.

FIG. 4 shows a sectional view of a second variation of a combination of the revolving bearing ring 10 with engagement disk 15 of the release bearing 4. Parts corresponding with those in FIG. 1 are again denoted by identical reference numerals. In this embodiment, the engagement disk 15 is formed by spray-coating a plastic coating directly onto the annular flange 11 of the bearing ring 10, whereby the plastic coating is held in abutment by a force. An additional form-fitting connection as well as centering of the engagement disk 15 is effected by applying the plastic coating for formation of the engagement disk 15 in such a manner that also an inner perimeter 26 of the annular flange 11 is covered. In addition, or alternatively, to the provision of an effective form-fitting securement of the engagement disk 15, the annular flange 11 may be formed with a plurality of symmetrically positioned recesses 27 and or bores 28 which can then be filled with plastic material of the engagement disk 15 during the spray-coating process.

Figure 5:
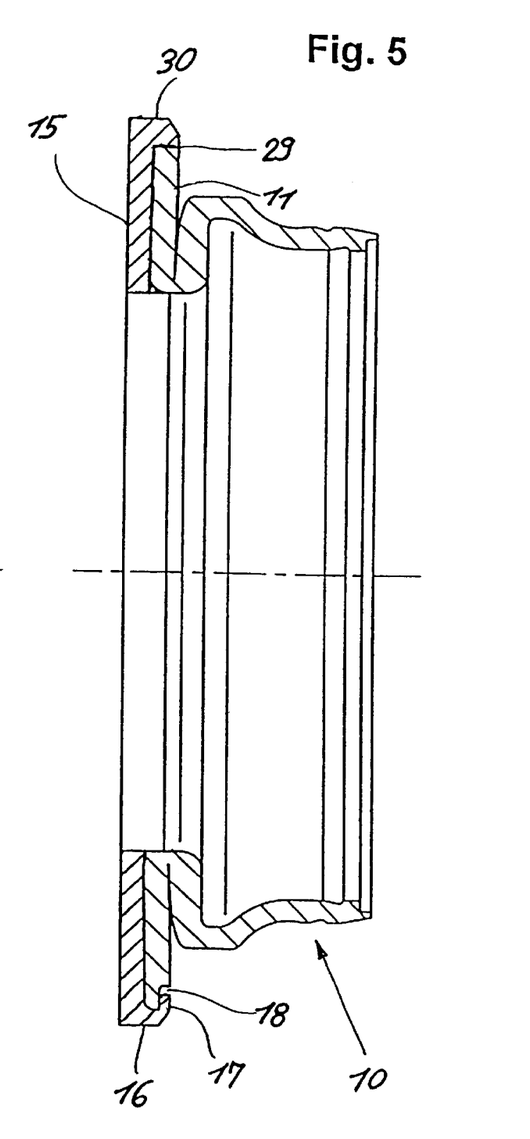
FIG. 5 is a sectional view of a third variation of a combination of a revolving bearing ring with engagement disk of the release bearing.

FIG. 5 shows a sectional view of a third variation of a combination of the revolving bearing ring 10 with engagement disk 15 of the release bearing 4. Parts corresponding with those in FIG. 1 are again denoted by identical reference numerals. In this embodiment, the engagement disk 15 is made of steel or other metallic material. The elasticity of steel permits a snap connection of the engagement disk 15 onto the annular flange 11 of the bearing ring 10. Like the embodiment shown in FIG. 1, the engagement disk 15 is formed about its outer circumference with at least one collar segment 16 which terminates in a hook-shaped retaining lug 17 which encircles or engages behind the recess 18 to thereby lock the retaining lug 17 in place. Radial cutouts 29 in offset relationship to the recess 18 on the outside of the annular flange 11 are provided for form-fitting engagement of complementary protrusions 30 of the engagement disk 15 to thereby secure the engagement disk 15 against rotating relative to the annular flange 11.

Figures 6, 7, 8:
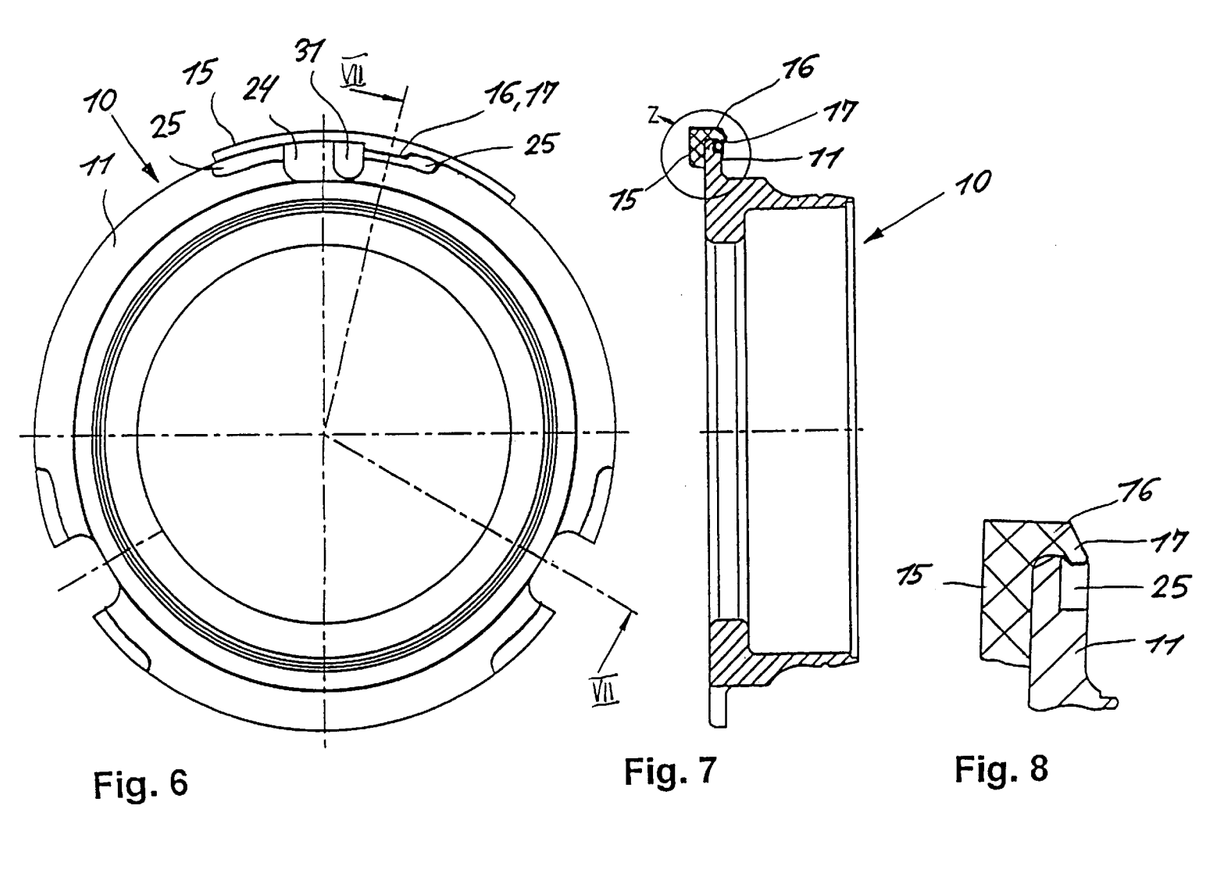
FIG. 6 is a plan view of a fourth variation of a combination of a revolving bearing ring with engagement disk of the release bearing.
FIG. 7 is a longitudinal section of the combination of bearing ring and engagement disk of FIG. 6, taken along the line VII—VII in FIG. 6.
FIG. 8 is an enlarged detailed view of the area encircled in FIG. 7 and marked "z"

FIG. 6 shows a sectional view of a fourth variation of a combination of the revolving bearing ring 10 with engagement disk 15 of the release bearing 4. Parts corresponding with those in FIG. 1 are again denoted by identical reference numerals. In this embodiment, the engagement disk 15 is formed with an axial cam 31 for engagement with clearance in the cutout 24 of the annular flange 11 of the bearing ring 10. The engagement disk 15 includes adjacent the cam 31 a collar segment 16 with retaining lug 17 for insertion in the groove 25 of the annular flange 11, as shown in particular in FIGS. 7 and 8. Detachment of the engagement disk 15 from the bearing ring 10 is realized through turning the engagement disk 15 counterclockwise until the cam 31 impacts against the opposite wall of the cutout 24. In this position, there is no overlap of the retaining lug 17 with respect to the outer contour of the annular flange 11. Depending on the rotation direction of the internal combustion engine and the attached separating clutch, the collar segment 16 in communication with the retaining lug 17 is so arranged relative to the cam 31 that a spontaneous detachment of the engagement disk 15 from the bearing ring 10 during operation is eliminated. This type of securement is used for engagement disks 15 made of a material having a modulus of elasticity that precludes an elastic snap connection of the collar segment 16 to the annular flange 11.

Figure 9:
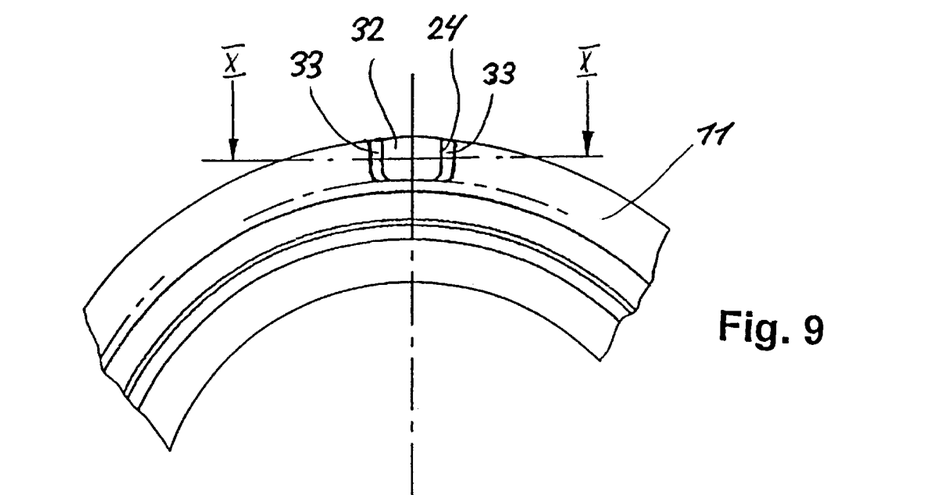
FIG. 9 is a cutaway view of an annular flange of a fifth variation of a revolving bearing ring for interaction with an engagement disk.
Figure 10:
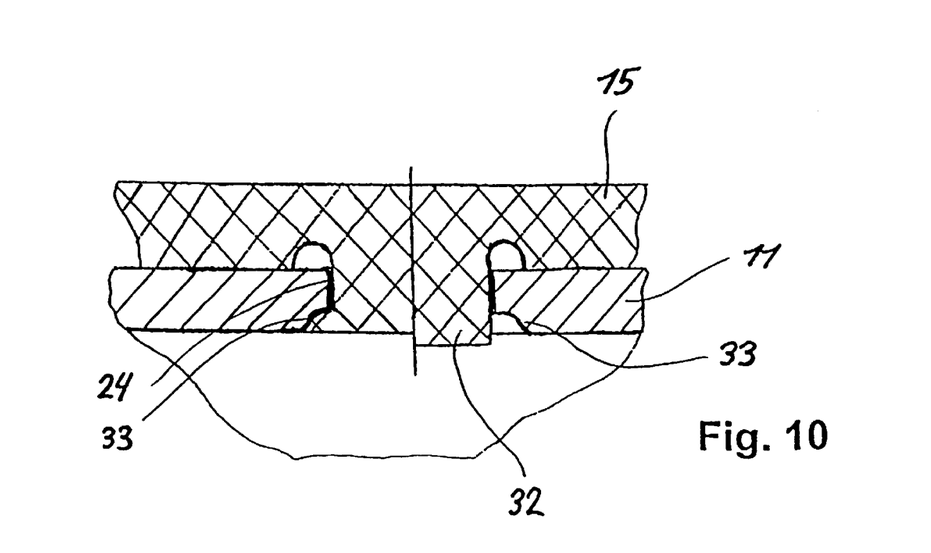
FIG. 10 is a sectional view, on an enlarged scale, of the combination of bearing ring and engagement disk of FIG. 9, taken along the line X—X in FIG. 9.

Turning now to FIG. 9, there is shown another variation of establishing a securement of the engagement disk 15 onto the annular flange 11 of the bearing ring 10. In this embodiment, the engagement disk 15 is made of plastic and the annular flange 11 is made of steel so that different coefficients of expansion are involved. The annular flange 11 is provided about its circumference with several radial cutouts 24, suitably in symmetric disposition, for engagement of axial cams 32 formed in one piece with the engagement disk 15. Provided in immediate proximity of each radial cutout 24 on each side thereof is a relief 33. The engagement disk 15 is secured to the annular flange 11 through, preferably, ultrasonic embossing the cams 32, which project axially beyond the wall thickness of the annular flange 11, so that the plastic material of the cams 32 at least are able to partially fill the reliefs 33 in the annular flange 11. This type of attachment compensates, for example, a diametrical enlargement of the engagement disk 15 in relation to the annular flange 11 as a consequence of the different coefficients of expansion of the used materials.

While the invention has been illustrated and described as embodied in a release bearing with improved connection to a separating clutch, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A release bearing for a separating clutch installed in a motor vehicle, comprising:
   a casing movable in an axial direction and operatively connected to an actuating mechanism;
   a non-rotational first bearing ring having a ring bottom supported by the casing;
   a revolving second bearing ring having a radially oriented annular flange;
   a plurality of rolling elements guided between the first and second bearing rings;
   a separate engagement disk made of low-friction and wear-resistant material placed in form fit relationship over an entire support surface of the radial annular flange and securely fixed with said annular flange; and
   a spring member operatively connected to the separating clutch and cooperating with the annular flange of the second bearing ring, wherein the spring member bears against the engagement disk.

2. The release bearing of claim 1, wherein the engagement disk has an outer collar for attachment onto the annular flange of the second bearing ring.

3. The release bearing of claim 2, wherein the collar is provided with a retaining lug for snap connection with the annular flange, when being installed.

4. The release bearing of claim 1, wherein the engagement disk has at least one axially projecting cam for engagement in a radial cutout of the annular flange, wherein the cutout is so configured as to allow a limited rotation of the engagement disk with respect to the annular flange and to guide the retaining lug of the collar in installed state in a circumferential gap of the annular flange over a limited angle.

5. The release bearing of claim 1, wherein the engagement disk and the annular flange of the second bearing ring are made of different materials.

6. The release bearing of claim 1, wherein the engagement disk has at least one axial cam for engagement in a radial cutout of the annular flange, wherein the cam has an end capable of plastically deforming and partially filling radial reliefs disposed laterally of the cutout.

7. The release bearing of claim 6, wherein the engagement disk is made of ceramic.

8. The release bearing of claim 1, wherein the engagement disk is made of steel and has an end face for support of the spring member, wherein the end face of the engagement disk is lined with at least one coating selected from the group consisting a material for enhancing sliding capability and a wear-reducing material.

9. The release bearing of claim 1, wherein the engagement disk is held in forced abutment with the annular flange of the second bearing ring.

10. The release bearing of claim 9, and further comprising a high-temperature glue for non-detachably connecting the engagement disk to the annular flange of the second bearing ring.

11. The release bearing of claim 9, wherein the engagement disk is spray-coated as coating directly onto the annular flange, wherein the coating is intended to partially fill out axial and radial reliefs of the engagement disk in recesses or cutouts of the annular flange.

12. The release bearing of claim 11, wherein the engagement disk in the form of a coating bears against an inner circumference of the annular flange in a form-fitting manner.

13. The release bearing of claim 1, wherein the engagement disk is connected to the annular flange by a combined force-fitting and form-fitting attachment.

14. The release bearing of claim 1, wherein the engagement disk is made of plastic.

15. The release bearing of claim 14, wherein the engagement disk is made of a duroplastic.

16. The release bearing of claim 14, wherein the engagement disk is made of a duroplastic material with friction-reducing and wear-reducing additives.

17. The release bearing of claim 16, wherein the additives include a phenol-formaldehyde (PF) containing at least a material selected from the group consisting of glass fiber, carbon fiber, graphite, molybdenum sulfide and polyphenylene sulfone (PPSO2).

18. The release bearing of claim 14, wherein the engagement disk is made of a thermoplastic material based on a highly heat-resistant polyamide.

19. The release bearing of claim 18, wherein the polyamide is selected from the group consisting of polyamide 46 (PA46) and polyaryletherketone.

20. The release bearing of claim 14, wherein the engagement disk is made of plastic through an injection molding process.

21. The release bearing of claim 1, wherein the second bearing ring is made of ceramic.

* * * * *